US011283997B2

(12) United States Patent
Moroda

(10) Patent No.: US 11,283,997 B2
(45) Date of Patent: Mar. 22, 2022

(54) SURVEILLANCE APPARATUS, METHOD FOR CONTROLLING THE SAME, AND STORAGE MEDIUM

(71) Applicant: CANON KABUSHIKI KAISHA, Tokyo (JP)

(72) Inventor: Hajime Moroda, Funabashi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/896,870

(22) Filed: Jun. 9, 2020

(65) Prior Publication Data
US 2020/0389590 A1 Dec. 10, 2020

(30) Foreign Application Priority Data

Jun. 10, 2019 (JP) .............................. JP2019-107960

(51) Int. Cl.
H04N 5/232 (2006.01)
H04N 5/235 (2006.01)
(52) U.S. Cl.
CPC ....... H04N 5/23245 (2013.01); H04N 5/2351 (2013.01); H04N 5/2353 (2013.01); H04N 5/23206 (2013.01); H04N 5/23218 (2018.08)

(58) Field of Classification Search
CPC .......... H04N 5/23245; H04N 5/23206; H04N 5/2353; H04N 5/2351; H04N 5/23218
See application file for complete search history.

(56) References Cited

U.S. PATENT DOCUMENTS

2015/0350769 A1* 12/2015 Sun ..................... H04R 1/326
348/14.08
2020/0045218 A1* 2/2020 Rathour ............... H05B 47/19

FOREIGN PATENT DOCUMENTS

JP H06113029 A 4/1994
JP 2015204510 A 11/2015

* cited by examiner

Primary Examiner — Ahmed A Berhan
(74) Attorney, Agent, or Firm — Canon U.S.A., Inc. IP Division

(57) ABSTRACT

A surveillance apparatus includes a communication unit configured to transmit a command to an external device, a detection unit configured to detect a change in a surrounding environment in a case where the change is caused by an operation of the external device or a peripheral device controlled by the external device operating in response to the command and a control unit configured to change, in a case where there is a function to be affected by the change detected by the detection unit, a setting of the function to a setting with which the function is not affected.

19 Claims, 11 Drawing Sheets

FIG.5

THE FOLLOWING SETTING IS AFFECTED BY
ON COMMAND TRANSMISSION.

CAMERA SETTINGS:
EXPOSURE - MANUAL — 231

CHANGE TO THE FOLLOWING RECOMMENDED
SETTING?

CAMERA SETTINGS:
EXPOSURE - AUTOMATIC — 232

YES — 233    NO — 234

FIG.10

THE FOLLOWING SETTING IS AFFECTED BY
ON COMMAND TRANSMISSION.

SOUND VOLUME DETECTION SETTING:
REFERENCE SOUND VOLUME − 30 dB     ~251

CHANGE TO THE FOLLOWING RECOMMENDED
SETTING?

REDUCE LEVEL OF ON COMMAND     ~252

YES ~253     NO ~254

SURVEILLANCE APPARATUS, METHOD FOR CONTROLLING THE SAME, AND STORAGE MEDIUM

BACKGROUND OF THE INVENTION

Field of the Invention

The present disclosure relates to a surveillance apparatus, a method for controlling the surveillance apparatus, and a recording medium.

Description of the Related Art

Some surveillance apparatuses can survey video images and acquire sounds by remote control via a network or a dedicated line. Such a surveillance apparatus can control an external device to cause the external device to perform an action, by transmitting a command to the external device using occurrence of a predetermined event as a trigger.

Japanese Patent Application Laid-Open No. 2015-204510 discusses a method for controlling home appliances by which an instruction of an action that is defined in trigger rules and satisfies a trigger condition is issued to a home appliance. In a case where the action is a toggle-type power source switching command, the power state of the home appliance is checked and then a power source switching instruction is issued to the home appliance.

Japanese Patent Application Laid-Open No. 6-113029 discusses a telephone system for controlling a preset apparatus to cause a power source of the preset apparatus to change to the OFF state in a case where a vibration is detected, and simultaneously setting a sound recording apparatus and an image recording apparatus to the operating state.

Among some external devices, when an external device is controlled for an action, a surrounding environment of the external device may change by a luminance change and a sound volume change due to the action. In such a case, the surveillance apparatus may be unable to capture an image of a subject intended by a user, or unintended sound volume detection may occur, and consequently, an unintended influence may be exerted on the surveillance apparatus.

There is a need in the art to reduce or prevent an influence occurring when the surrounding environment changes.

SUMMARY OF THE INVENTION

According to an aspect of the present disclosure, a surveillance apparatus includes a communication unit configured to transmit a command to an external device, a detection unit configured to detect a change in a surrounding environment in a case where the change is caused by an operation of the external device or a peripheral device controlled by the external device operating in response to the command and a control unit configured to change, in a case where there is a function to be affected by the change detected by the detection unit, a setting of the function to a setting with which the function is not affected.

Further features of the present disclosure will become apparent from the following description of exemplary embodiments with reference to the attached drawings.

BRIEF DESCRIPTION OF THE DRAWINGS

FIG. 5 is a diagram illustrating an example of a display screen for prompting a user to change a setting.

FIG. 10 is a diagram illustrating an example of a display screen for prompting the user to change a setting.

DESCRIPTION OF THE EMBODIMENTS

Exemplary embodiments of the present disclosure will be described in detail below with reference to the accompanying drawings.

Figure 1:
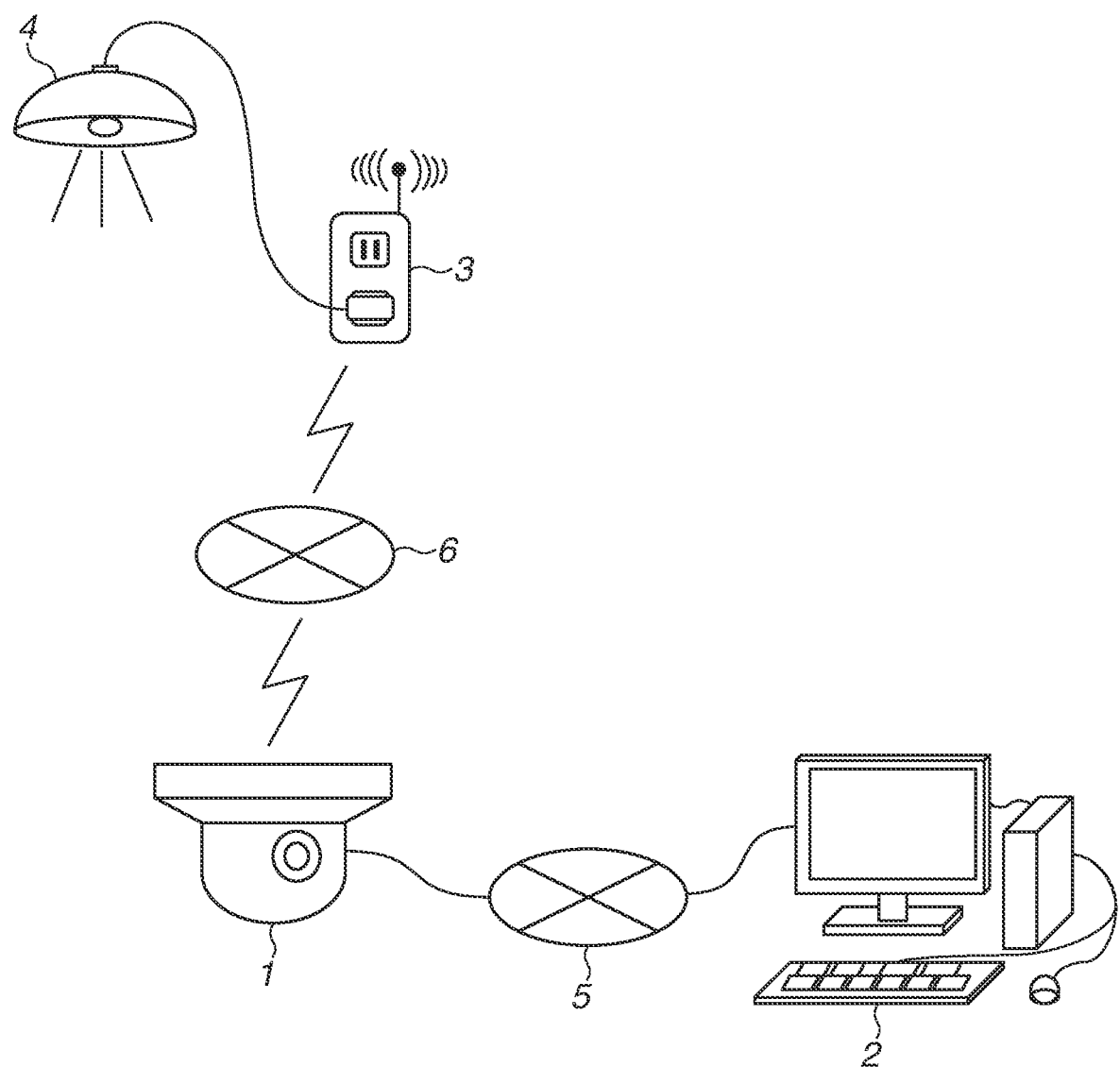
FIG. 1 is a diagram illustrating an example of a surveillance system according to a first exemplary embodiment.

FIG. 1 is a diagram illustrating an example of a surveillance system according to a first exemplary embodiment.

The surveillance system according to the present exemplary embodiment includes a surveillance apparatus 1, a client apparatus 2, a device control apparatus 3, and a peripheral device 4.

The surveillance apparatus 1 is a surveillance camera for capturing a moving image of a subject, such as a person. For example, a network camera is used as the surveillance apparatus 1. The surveillance apparatus 1 communicates with the client apparatus 2 and the device control apparatus 3.

The client apparatus 2 controls the operation of the surveillance apparatus 1. For example, an information processing apparatus, such as a personal computer (PC), can be used as the client apparatus 2. The client apparatus 2 has a display unit and functions as a display control apparatus for controlling the display unit.

The device control apparatus 3 controls the peripheral device 4 by supplying power to the connected peripheral device 4 and stopping power supply thereto. For example, a smart receptacle or a smart plug can be used as the device control apparatus 3. The device control apparatus 3 is an example of an external device.

The peripheral device 4 is controlled by the device control apparatus 3. More specifically, the peripheral device 4 operates by receiving the power supplied by the device control apparatus 3. The peripheral device 4 is connected to the device control apparatus 3 via a power cable. The peripheral device 4 according to the present exemplary embodiment is an illumination apparatus. When the peripheral device 4 operates, luminance as a surrounding environment of the surveillance apparatus 1 changes.

The surveillance apparatus 1 and the client apparatus 2 are connected to each other via a network 5 to communicate with each other. Examples of the network 5 include a plurality of routers, switches, and cables conforming to Ethernet (registered trademark) and other communication standards. However, the communication standard, scale, and configuration are not limited as long as communication between the surveillance apparatus 1 and the client apparatus 2 is possible.

The client apparatus 2 transmits various control commands to the surveillance apparatus 1. Control commands include, for example, commands for setting imaging parameters, commands for setting ON/OFF command transmission conditions, and commands for controlling the surveillance apparatus 1. The surveillance apparatus 1 transmits a response to a received control command to the client apparatus 2.

The surveillance apparatus 1 and the device control apparatus 3 are connected to each other via a wireless or wired network 6 to communicate with each other. For example, the network 6 can be a network conforming to Z-Wave, Zigbee (registered trademark), and the communication standards such as wireless LAN. However, the communication standard, scale, and configuration are not limited as long as communication between the surveillance apparatus 1 and the device control apparatus 3 is possible.

The surveillance apparatus 1 transmits the ON/OFF command to the device control apparatus 3 to perform ON/OFF control. The ON/OFF command is an example of a predetermined command. For example, the ON/OFF command according to the present exemplary embodiment represents an ON/OFF state parameter using an integer value from 0 to 100. When the ON/OFF state parameter is a number from 1 to 100, it represents the level of the ON command (first command). The ON command is an instruction that the peripheral device 4 changes to the ON state. The ON/OFF state parameter from 1 to 100 is parameter information for specifying the level at which the peripheral device 4 operates in the ON state. When the ON/OFF state parameter is 0, it represents the OFF command (second command). The OFF command is an instruction that the peripheral device 4 changes to the OFF state.

The device control apparatus 3 turns power supply to the peripheral device 4 ON or OFF in response to the received ON/OFF command. When receiving the OFF command, the device control apparatus 3 stops power supply to the peripheral device 4. Therefore, when the peripheral device 4 is in the ON state, the peripheral device 4 changes to the OFF state. Meanwhile, when receiving the ON command, the device control apparatus 3 starts power supply to the peripheral device 4. Therefore, when the peripheral device 4 is in the OFF state, the peripheral device 4 changes to the ON state. In this process, when the parameter information in the ON command is closer to 100, the device control apparatus 3 supplies more power to the peripheral device 4, and when the parameter information in the ON command is closer to 1, the device control apparatus 3 supplies less power to the peripheral device 4. Therefore, the level at which the peripheral device 4 operates in the ON state changes according to the parameter information in the ON command. According to the present exemplary embodiment, since the peripheral device 4 is an illumination apparatus, the peripheral device 4 operates at higher illuminance when the parameter information is closer to 100 and operates at lower illuminance when the parameter information is closer to 1. However, the peripheral device 4 may constantly operate at the same level in the ON state when the parameter is within a range from 1 to 100. The device control apparatus 3 transmits and receives control commands for establishing, maintaining, and terminating communication between the surveillance apparatus 1 and the device control apparatus 3 as required.

Figure 2:
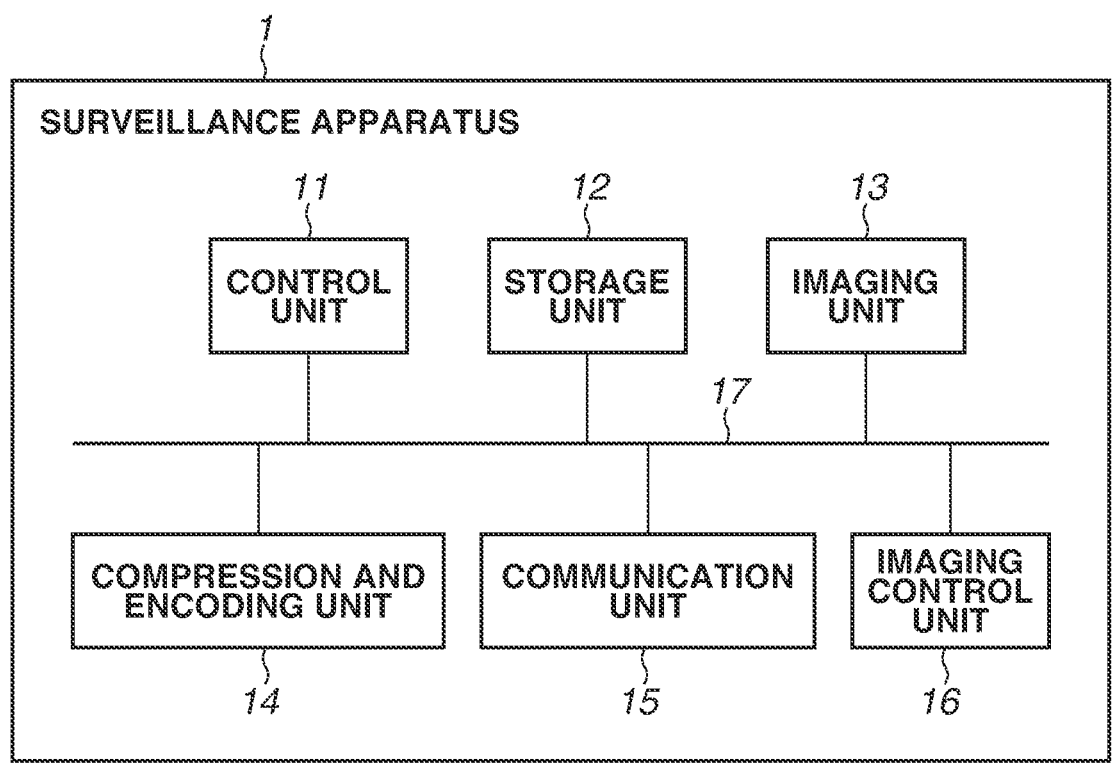
FIG. 2 is a diagram illustrating an example of a configuration of a surveillance apparatus.

The configuration of the surveillance apparatus 1 will be described below. FIG. 2 is a diagram illustrating an example of the configuration of the surveillance apparatus 1.

The surveillance apparatus 1 includes a control unit 11, a storage unit 12, an imaging unit 13, a compression and encoding unit 14, a communication unit 15, and an imaging control unit 16. The components of the surveillance apparatus 1 are connected to each other via a bus 17. The surveillance apparatus 1 may include a human sensor or may be connected to an external human sensor.

The control unit 11 controls the entire surveillance apparatus 1. The control unit 11 includes, for example, a central processing unit (CPU).

The storage unit 12 is used as storage areas for storing various types of data. More specifically, the storage unit 12 is mainly used as, for example, a storage area for storing programs to be executed by the control unit 11, a work area during program execution, a storage area for storing setting information such as an exposure setting that is used by the imaging unit 13, and a storage area for storing image data generated by the imaging unit 13.

The imaging unit 13 converts an analog signal, acquired by capturing a subject image formed by an imaging optical system of the surveillance apparatus 1, into digital data, subjects the digital data to necessary image processing, and sequentially stores the resultant data as captured images in the storage unit 12. In a case where a captured image is stored in the storage unit 12, the control unit 11 receives an image acquisition event from the imaging unit 13.

The compression and encoding unit 14 performs compressing and encoding processing conforming to the Joint Photographic Experts Group (JPEG) or H.264 format to the captured image stored by the imaging unit 13 to generate image data, and stores the image data in the storage unit 12.

The communication unit 15 receives a control command from an external device and transmits a response to the control command to the external device. When the communication unit 15 receives a command from the external device, the control unit 11 receives a command reception event from the communication unit 15. The communication unit 15 transmits a control command generated by the control unit 11 to the external device. The communication unit 15 further sequentially reads the image data generated by the compressing and encoding processing by the compression and encoding unit 14 from the storage unit 12, and transmits the resultant image data as a video stream to the client apparatus 2.

The imaging control unit 16 drives the drive unit by panning, tilting, rotating, zooming, and focusing based on the pan, tilt, rotation, zoom, and focus values, respectively, specified by the control unit 11 to change the viewing angle of the imaging unit 13. The surveillance apparatus 1 may not include the drive unit.

The display screen of imaging settings displayed on the client apparatus 2 will be described below.

Figure 3:
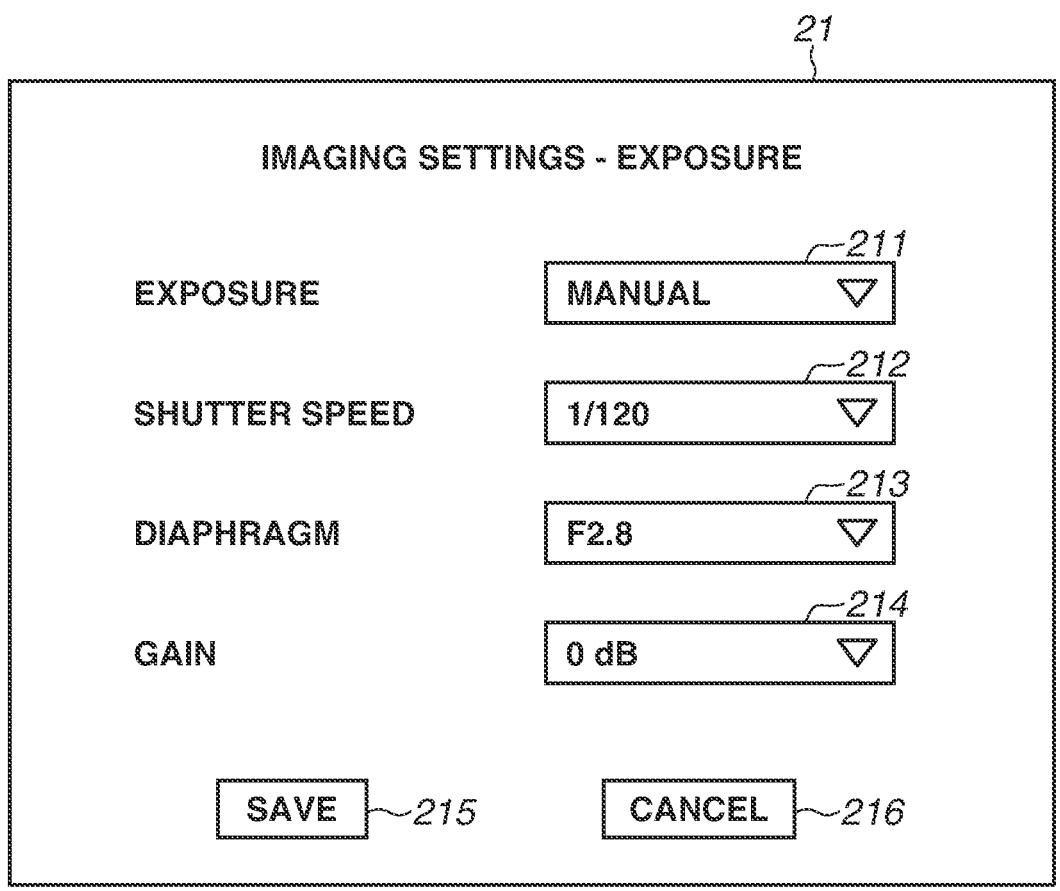
FIG. 3 is a diagram illustrating an example of a display screen of imaging settings.

FIG. 3 is a diagram illustrating an example of a display screen 21 of the exposure setting from among the imaging settings in the surveillance apparatus 1. The display screen 21 is displayed when the control unit of the client apparatus 2 executes a program stored in the storage unit of the client apparatus 2, based on an instruction for performing the exposure setting by the user.

The display screen 21 displays a selection list 211 for setting the manual/automatic mode for the exposure setting, a selection list 212 for setting a shutter speed, a selection list 213 for setting a diaphragm, and a selection list 214 for setting a gain. The display screen 21 displays a save button 215 for storing the settings and a cancel button 216 for canceling the settings. For example, in a case where the user selects one of the selection lists 211 to 214, a plurality of settings and setting values for each selection list is displayed in, what is called, a drop-down list, and therefore the user can select a setting and a setting value.

The user operates the client apparatus 2 in advance when the device control apparatus 3 is in the OFF state to perform the exposure setting in the surveillance apparatus 1. FIG. 3 illustrates a case where the user selects a manual mode for the exposure setting from the selection list 211 and then selects specific settings related to exposure in the selection list 212 to 214. In a case where the user presses the save button 215, the control unit of the client apparatus 2 stores information about the exposure setting in the storage unit.

The control unit of the client apparatus 2 transmits the information about the exposure setting input by the user to the surveillance apparatus 1. The communication unit 15 of the surveillance apparatus 1 receives the information about the exposure setting, and the control unit 11 stores the information about the exposure setting in the storage unit 12. The exposure setting has been described above. The exposure setting may be at least either one of the focusing, image processing, infrared light filter switching, illumination control, and image analysis settings as long as the setting is affected by the luminance change.

A display screen of event settings displayed on the client apparatus 2 will be described below.

Figure 4:
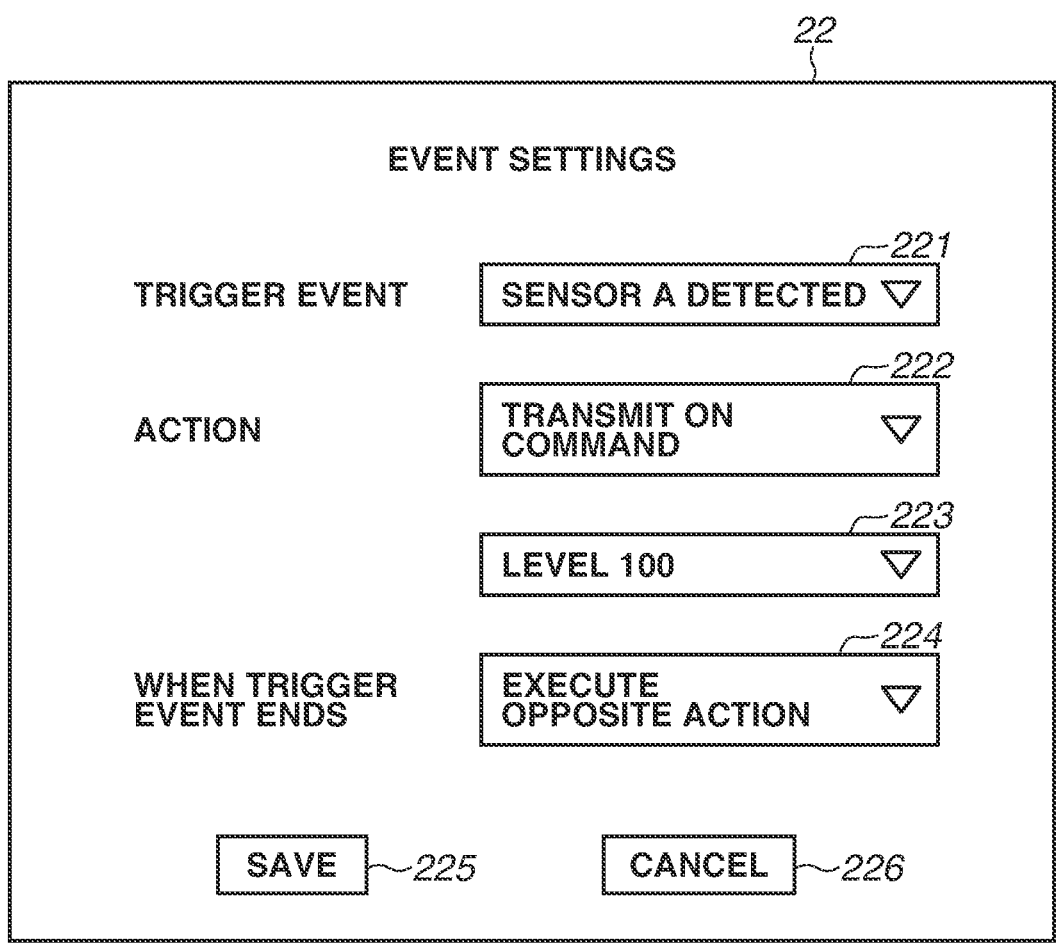
FIG. 4 is a diagram illustrating an example of a display screen of event settings.

FIG. 4 illustrates an example of a display screen 22 of the event settings in the surveillance apparatus 1. The display screen 22 is displayed in a case where the control unit of the client apparatus 2 executes a program stored in the storage unit of the client apparatus 2, based on an instruction for performing the event setting by the user.

The display screen 22 displays a selection list 221 for setting a trigger event, a selection list 222 for setting the action to be performed when the trigger event occurs, and a selection list 223 for specifying action parameter information as required. The display screen 22 also displays a selection list 224 for setting the action to be performed at the end of an event if the event is a continuous trigger event, a save button 225 for storing the settings, and a cancel button 226 for canceling the settings. Even if the trigger event is not a continuous event but a one-time event, the event may be set to be recognized that the event is ended when a predetermined period of time has elapsed. In a case where the trigger event occurs, the control unit 11 of the surveillance apparatus 1 stores information on the event occurrence in the storage unit 12.

The user operates the client apparatus 2 in advance to perform the event setting on the surveillance apparatus 1. Using the selection list 221, the user sets the trigger event for when the ON command is transmitted. In the case illustrated in FIG. 4, the event settings are set to use reception of detection information from a human sensor (sensor A) as a trigger. According to the present exemplary embodiment, any event type that can be set on the surveillance apparatus 1 can be set. For example, in a case where the surveillance apparatus 1 includes an image analysis function and an audio analysis function, acquisition of detection information from the image analysis and audio analysis functions may be set as a trigger.

Using the selection list 222, the user sets the action to be performed when the trigger event occurs. In the case illustrated in FIG. 4, the ON command transmission is set as an action.

Using the selection list 223, the user sets the parameter information (level) in the ON command to a value from 1 to 100 as required. In the case illustrated in FIG. 4, level 100 is set as the parameter information.

Using the selection list 224, the user sets the action to be performed when the trigger event ends. In the case illustrated in FIG. 4, the selection list 224 is set to perform an opposite action. Performing the opposite action is equivalent to the OFF command transmission. In a case where the user presses the save button 225, the control unit of the client apparatus 2 stores information about the event settings in the storage unit.

The control unit of the client apparatus 2 transmits the information about the event settings input by the user to the surveillance apparatus 1. The communication unit 15 of the surveillance apparatus 1 receives the information about the event settings, and the control unit 11 stores the information about the event settings in the storage unit 12.

Although, in the above-described case, the ON command is transmitted when the trigger event occurs, and the OFF command is transmitted when the trigger event ends, the present disclosure is not limited thereto. For example, the ON/OFF command may be manually transmitted when the user presses a certain button in a display screen (not illustrated).

A display screen for prompting the user to change the setting displayed in the client apparatus 2 will be described below. The display screen illustrated in FIG. 5 is displayed in a case where the control unit of the client apparatus 2 executes a program stored in the storage unit of the client apparatus 2 at a timing of step S14 of the flowchart illustrated in FIG. 6 (described below).

A display screen 23 includes display areas 231 and 232. The display area 231 notifies the user of a setting to be affected when the surveillance apparatus 1 transmits the ON command, the peripheral device 4 operates, and a luminance change is caused by the operation of the peripheral device 4. The display area 232 notifies the user of a recommended setting related to the setting to be affected. The display screen 23 displays a YES button 233 for determining to change the setting to the recommended setting, and a NO button 234 for determining to leave the setting unchanged.

The user operates the client apparatus 2 to determine whether to change the setting to the recommended setting. More specifically, in a case where the user checks the settings displayed in the display areas 231 and 232 and wants to change the setting to the recommended setting, the user presses the YES button 233. Then, the control unit of the client apparatus 2 stores information about the recommended setting in the storage unit.

The control unit of the client apparatus 2 transmits the information about the recommended setting to the surveillance apparatus 1 via the network 5. The communication unit 15 of the surveillance apparatus 1 receives the information about the recommended setting, and the control unit 11 stores the information about the recommended setting in the storage unit 12. In a case where the user presses the NO button 234, the control unit of the client apparatus 2 transmits information indicating that the current settings are maintained, to the surveillance apparatus 1 via the network 5. In a case where the communication unit 15 of the surveillance apparatus 1 receives the information indicating that the current settings are maintained, the control unit 11 stores the information indicating that the current settings are maintained, in the storage unit 12.

An example of processing performed by the surveillance apparatus 1 to reduce or prevent an influence of a change in the surrounding environment that is exerted by an operation of the peripheral device 4 will be described below with reference to the flowchart illustrated in FIG. 6.

Figure 6:
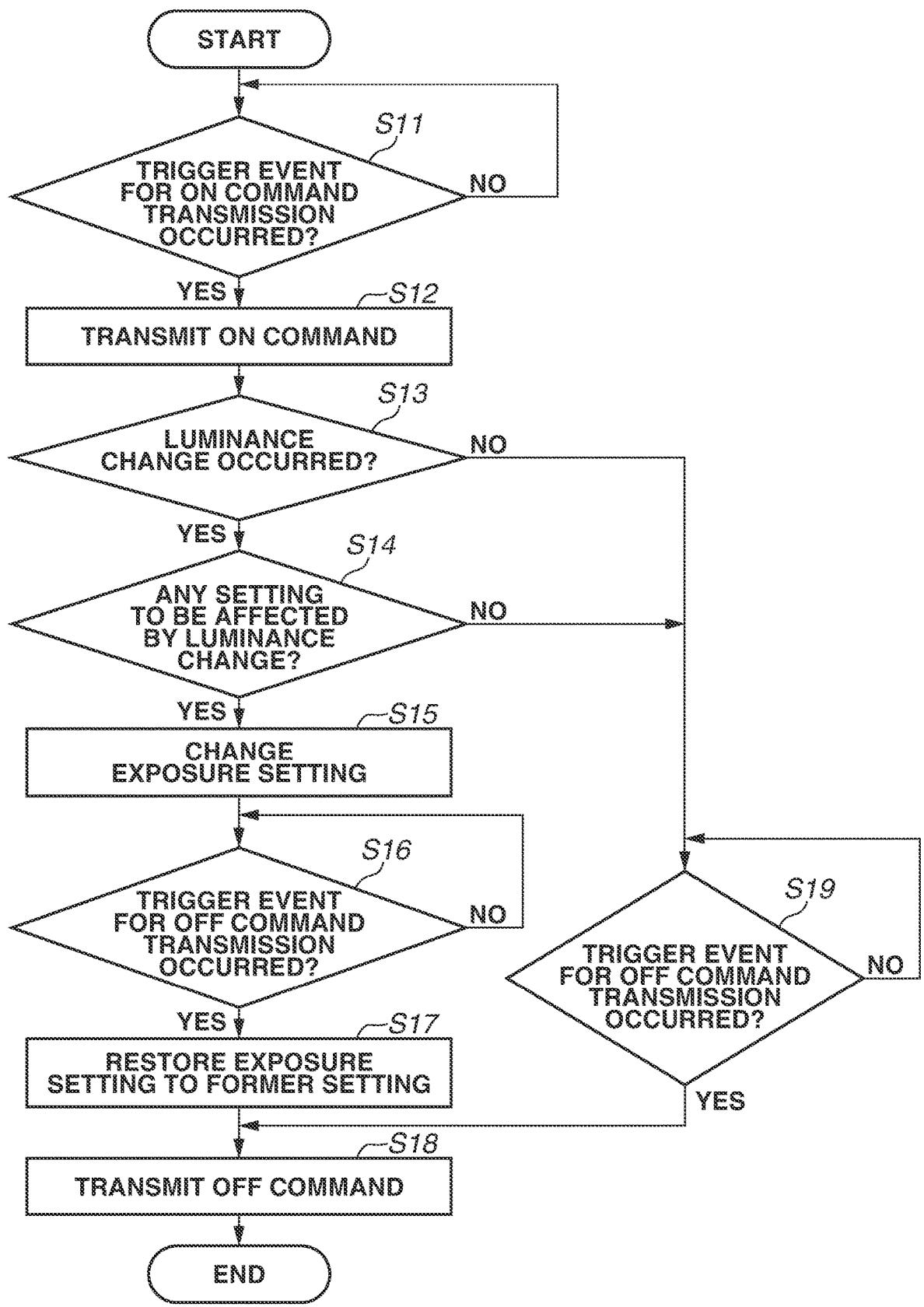
FIG. 6 is a flowchart illustrating an example of processing of the surveillance apparatus.

The processing procedure of the flowchart illustrated in FIG. 6 is implemented when the control unit 11 of the surveillance apparatus 1 executes a program stored in the storage unit 12. The processing procedure of the flowchart illustrated in FIG. 6 is started when the surveillance apparatus 1 is activated and then is connected to the device control apparatus 3 to communicate with each other. A description will be given of a case where the user has performed the exposure setting and the event settings and the information about the exposure setting and the information about the event settings have been stored in the storage unit 12 of the surveillance apparatus 1.

In step S11, the control unit 11 determines whether the trigger event for performing the action (the ON command transmission in step S12) occurs. More specifically, the control unit 11 reads the information about the event settings stored in the storage unit 12 and determines whether the detection information is received from the human sensor (sensor A) as the trigger event. In a case where the trigger event occurs (YES in step S11), the processing proceeds to step S12. Meanwhile, in a case where the trigger event does not occur (NO in step S11), the control unit 11 waits for occurrence of the trigger event.

In step S12, the control unit 11 performs the action in response to the occurrence of the trigger event. More specifically, the control unit 11 reads the information about the event settings stored in the storage unit 12 and transmits the ON command to the device control apparatus 3 as the action via the communication unit 15. If the network 6 conforms to the communication standard Z-Wave, the control unit 11 can transmit the ON command by using the Binary Switch Set command or the Multilevel Switch Set command. The control unit 11 may transmit a general-purpose command for transmitting only numeric values. More specifically, the control unit 11 may transmit the ON command by specifying a value of 1 or larger by the Basic command conforming to Z-Wave.

When receiving the ON command, the device control apparatus 3 starts power supply to the peripheral device 4, and then the peripheral device 4 changes from the OFF to the ON state. According to the present exemplary embodiment, the peripheral device 4 changes the illumination from the OFF state to the ON state. In a case where the ON command includes the parameter information, the device control apparatus 3 supplies power according to the parameter information. In a case where the device control apparatus 3 has already received the ON command, the device control apparatus 3 continues power supply.

In step S13, the control unit 11 detects a change in the surrounding environment before and after performing the action and determines whether the surrounding environment has changed. More specifically, the control unit 11 acquires information about luminance of the subject in a viewing angle captured by the imaging unit 13 before and after the ON command transmission, and determines whether the luminance has changed. The imaging unit 13 measures the average luminance of the subject by using a photometry sensor or an image sensor and stores the average luminance in the storage unit 12 before and after the ON command transmission, and therefore the control unit 11 can acquire the information about the luminance of the subject. The average luminance may be average luminance of the entire viewing angle. The luminance emphasizing the central part of the viewing angle or other specific regions may be also used as the average luminance.

The control unit 11 compares the average luminance immediately before the ON command transmission with the average luminance after the ON command transmission (e.g., after one second). In a case where a difference between the two average luminances is equal to or larger than a predetermined value (threshold value), the control unit 11 determines that a luminance change has occurred. An average value of luminance in a predetermined period of time, e.g., one second, may be used as the average luminance. The threshold value may be prestored in the storage unit 12, or the user may set a threshold value in the surveillance apparatus 1 via the client apparatus 2.

In a case where the control unit 11 determines that a luminance change has occurred (YES in step S13), the processing proceeds to step S14. Meanwhile, in a case where the control unit 11 determines that a luminance change has not occurred (NO in step S13), the processing proceeds to step S19.

In step S14, the control unit 11 determines whether there is a setting to be affected by a change in the surrounding environment, based on information about various settings stored in the storage unit 12. More specifically, the control unit 11 determines whether there is a setting to be affected by a luminance change. A setting to be affected by a luminance change is a setting which causes an unintended result in a situation different from the luminance of the subject intended by the user. For example, in a case where the manual mode is maintained to be set for the exposure setting illustrated in FIG. 3, the exposure is affected by a luminance change, and visibility of a captured image of the subject is reduced. Therefore, the exposure setting is affected by a luminance change.

The storage unit 12 prestores information about the settings to be affected by a luminance change. Therefore, in a case where there is a setting prestored as a setting to be affected by a luminance change among various settings stored in the storage unit 12, the control unit 11 can determine that there is a setting to be affected by a luminance change.

In a case where there is a setting to be affected by a luminance change (YES in step S14), the processing proceeds to step S15. Meanwhile, when there is no setting to be affected by a luminance change (NO in step S14), the processing proceeds to step S19.

In a case where there is a setting to be affected by a change in the surrounding environment, the control unit 11 may transmit information indicating that there is a setting to be affected by a change in the surrounding environment, to the client apparatus 2 via the communication unit 15. When receiving the information indicating that there is a setting to be affected by a change in the surrounding environment, the client apparatus 2 may display a display screen for prompting the user to change the setting to be affected, on the display unit of the client apparatus 2. More specifically, referring to the display screen 23 illustrated in FIG. 5, the display area 231 displays the exposure setting as a setting to be affected by the ON command transmission, and the display area 232 displays the automatic exposure setting as a recommended setting. The client apparatus 2 can display the display screen 23 by receiving display data for displaying a display screen from the surveillance apparatus 1 and by referencing display data stored in the storage unit of the client apparatus 2.

The control unit of the client apparatus 2 transmits information indicating whether the user has determined to change the setting to the recommended setting to the surveillance apparatus 1. By the communication unit 15 of the surveillance apparatus 1 receiving the information indicating that the user has determined to change the setting to the recommended setting, the processing of step S15 is performed. Meanwhile, by the communication unit 15 not receiving the information, the processing of step S19 is performed.

In step S15, the control unit 11 changes the setting to be affected by a change in the surrounding environment. For example, in a case where the diaphragm, shutter speed, and gain settings for the exposure setting are set to fixed values, which are examples of the settings to be affected by a luminance change, the control unit 11 changes the mode of the exposure setting from the manual mode to the automatic mode. More specifically, the control unit 11 changes the setting to a setting not to be affected by a luminance change (or to a setting hardly affected thereby). The control unit 11 stores the settings before the change in the storage unit 12. More specifically, the control unit 11 stores the manual mode for the exposure setting and also stores the diaphragm, shutter speed, and gain settings for the exposure setting.

In step S16, the control unit 11 determines whether the trigger event for performing the action (ON command transmission in step S12) is completed. The control unit 11 may also determine whether a trigger event for performing a different action (OFF command transmission in step S18) occurred. More specifically, the control unit 11 reads the information about the event settings stored in the storage unit 12 and determines whether the detection information is no longer received from the human sensor (sensor A). In a case where the trigger event is completed (YES in step S16), the processing proceeds to step S17. Meanwhile, in a case where the trigger event is not completed (NO in step S16), the control unit 11 waits for completion of the trigger event.

In step S17, the control unit 11 restores the settings which have been changed, to the former settings set before the change. More specifically, the control unit 11 reads the manual mode for the exposure setting and reads also the diaphragm, shutter speed, and gain settings for the exposure setting stored in the storage unit 12 in step S15, to reset these settings to the imaging unit 13.

In step S18, when completing the trigger event, the control unit 11 performs the action to be performed at the end of the trigger event. More specifically, the control unit 11 reads the information about the event settings stored in the storage unit 12, and transmits the OFF command as the action to be performed at the end of the trigger event, to the device control apparatus 3 via the communication unit 15.

When receiving the OFF command, the device control apparatus 3 stops power supply to the peripheral device 4, and accordingly, the peripheral device 4 changes from the ON state to the OFF state. In a case where the device control apparatus 3 has already received the OFF command, the device control apparatus 3 keeps stopping power supply.

In a case where a luminance change does not occur (NO in step S13) or when there is no setting to be affected by a luminance change (NO in step S14), the processing proceeds to step S19. The processing in step S19 is similar to the processing in step S16. In a case where the trigger event is completed (YES in step S19), the processing proceeds to step S18. Meanwhile, in a case where the trigger event is not completed (NO in step S19), the control unit 11 waits for completion of the trigger event. More specifically, in a case where the processing proceeds to step S19, the control unit 11 does not perform the processing for changing the setting in step S15 and therefore the processing of step S15 is skipped.

According to the present exemplary embodiment, in a case where the surveillance apparatus 1 transmits a predetermined command to the device control apparatus 3, and if the surrounding environment is changed by the peripheral device 4 operating under control of the device control apparatus 3, the setting to be affected by a change in the surrounding environment is changed to a setting not to be affected thereby. Therefore, an influence that causes the user to be unable to perform intended surveillance using the surveillance apparatus 1 if the surrounding environment is changed by the operation of the peripheral device 4 can be reduced or prevented.

More specifically, in a case where the surveillance apparatus 1 captures an image of a subject and if a luminance change occurs by an operation of the peripheral device 4, the exposure setting is changed from the manual mode to the automatic mode, and therefore exposure according to the luminance change can be set in the imaging unit 13. This enables the surveillance apparatus 1 to capture an image of the subject intended by the user, and reduces (or also prevents) an influence of when a luminance change occurs.

According to the present exemplary embodiment, the surveillance apparatus 1 restores the settings changed when the OFF command is transmitted to the device control apparatus 3, to the former setting set before the change. Therefore, in a case where no change in the surrounding environment occurs, the user can perform intended surveillance using the surveillance apparatus 1.

While the present exemplary embodiment has been described above centering on a case where the settings are changed based on a luminance change each time when the ON command is transmitted, the present disclosure is not limited thereto. For example, in a case where the control unit 11 determines that, when a luminance change occurs after once transmitting the ON command, there is a setting to be affected by the luminance change, the control unit 11 may change the setting in advance when transmitting the ON command for the second time and subsequent times.

More specifically, when a luminance change occurs after once transmitting the ON command, and if there is a setting to be affected by the luminance change, the control unit 11 stores information indicating that there is a setting to be affected in the storage unit 12. In a case where the information indicating there is a setting to be affected is stored in the storage unit 12 when transmitting the ON command for the second time and subsequent times, the present exemplary embodiment can be implemented by changing the setting to be affected before the ON command transmission. In addition, the control unit 11 may detect a luminance change also when transmitting the ON command for the second time and subsequent times. Then, in a case where a luminance change is not detected, the control unit 11 may substantially delete the information indicating there is a setting to be affected from the storage unit 12, and then restore the settings to the former setting before the change.

The present exemplary embodiment has been described above centering on a case where the control unit 11 determines that a luminance change of the subject has occurred if a luminance change occurs even once after the ON command transmission, the present disclosure is not limited thereto. For example, the control unit 11 may determine that a luminance change has occurred after the ON command transmission if a luminance change successively occurs a predetermined number of times each time the control unit 11 transmits the ON command. Although the present exemplary embodiment has been described above centering on a case where the manual mode of the exposure setting is changed to the automatic mode, the present disclosure is not limited thereto. For example, when the setting itself can be enabled or disabled as for the image analysis function, the control unit 11 may temporarily enable or disable the setting after the ON command transmission instead of changing the setting.

Although the first exemplary embodiment has been described above centering on a case where the control unit 11 determines whether a luminance change occurs after the ON command transmission, the second exemplary embodiment determines whether an audio change occurs after the ON command transmission. The first exemplary embodiment has been described above centering on a case where the setting itself to be affected in a case where an environmental change occurs is changed. The present exemplary embodiment will be described below centering on a case where the parameter information in the ON command is changed in a case where an environmental change occurs.

Figure 7:
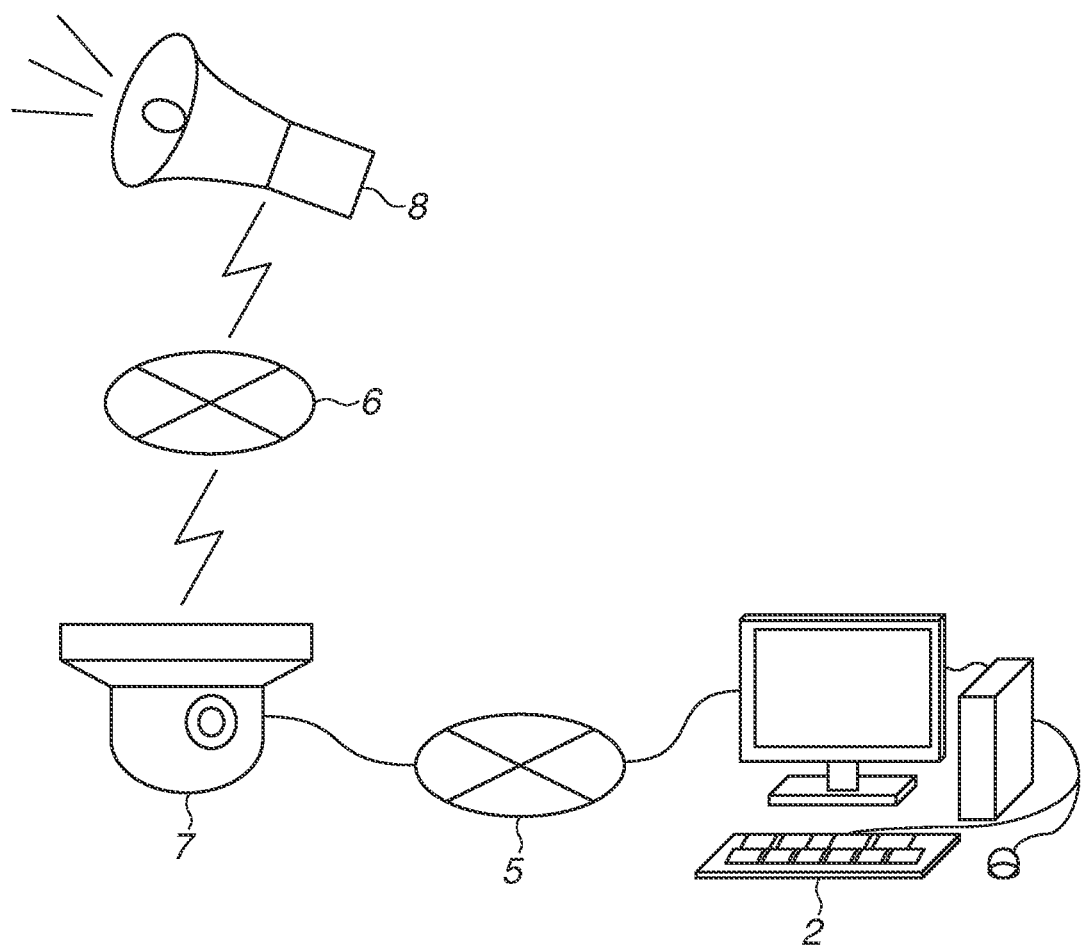
FIG. 7 is a diagram illustrating an example of a configuration of a surveillance system according to a second exemplary embodiment.

FIG. 7 is a diagram illustrating an example of a configuration of a surveillance system according to the second exemplary embodiment.

The surveillance system according to the present exemplary embodiment includes a surveillance apparatus 7, a client apparatus 2, and a device control apparatus 8. The client apparatus 2, the network 5, and the network 6 have similar configurations to those according to the first exemplary embodiment.

The surveillance apparatus 7 is a surveillance camera for acquiring audio and performing audio processing and analysis. For example, a network camera having a microphone is used as the surveillance apparatus 7. However, the surveillance apparatus 7 may be connected to an external microphone. The surveillance apparatus 7 communicates with the client apparatus 2 and the device control apparatus 8. Like the first exemplary embodiment, the surveillance apparatus 7 also transmits the ON/OFF command to the device control apparatus 8.

The device control apparatus 8 having an audio output function is a communication apparatus capable of changing the sound volume. The device control apparatus 8 according to the present exemplary embodiment is a siren with a wireless communication function. The device control apparatus 3 is an example of an external device. When the device control apparatus 8 operates, the sound as a surrounding environment of the surveillance apparatus 7 changes. When receiving the ON/OFF command from the surveillance apparatus 7, the device control apparatus 8 controls output of the siren, i.e., audio output. The level at which the device control apparatus 8 operates in the ON state changes according to the parameter information in the ON command. According to the present exemplary embodiment, since the device control apparatus 8 is a siren, the siren operates at a higher sound volume when the parameter information is closer to 100), and the siren operates at a lower sound volume when the parameter information is closer to closer to 1. The device control apparatus 8 transmits and receives control commands for establishing, maintaining, and completing communication with the surveillance apparatus 7 as required.

The device control apparatus 8 may be configured to supply power to an external audio output apparatus having a communication function, in response to the ON/OFF command received from the surveillance apparatus 7.

Figure 8:
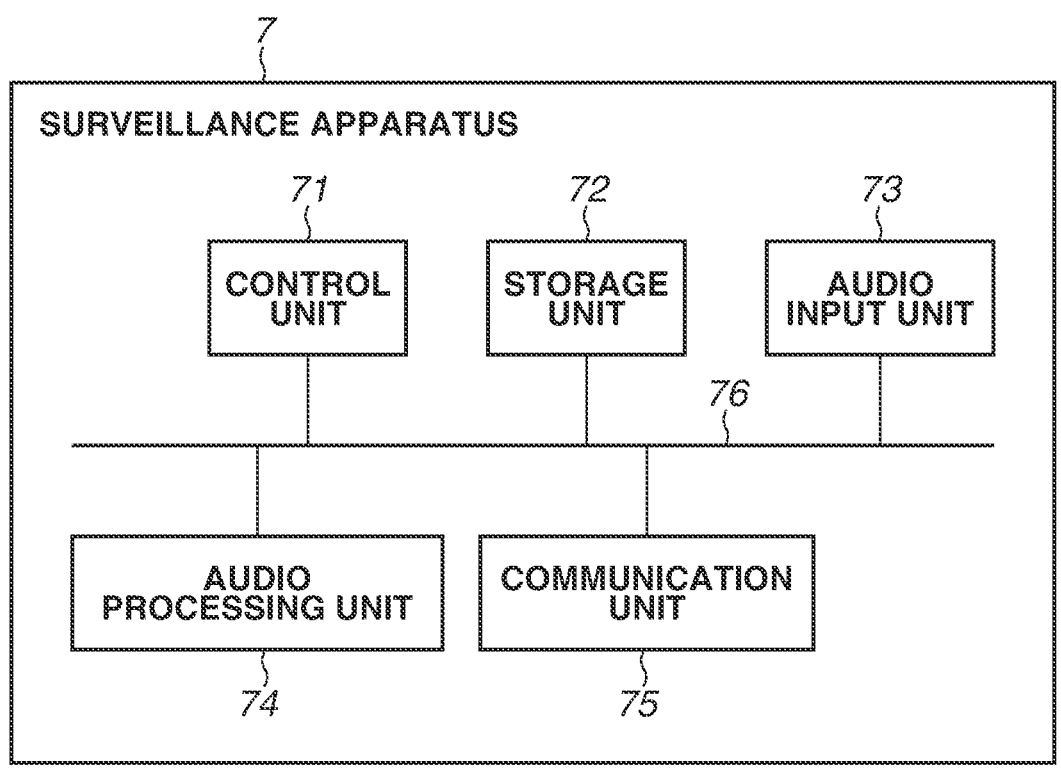
FIG. 8 is a diagram illustrating an example of a configuration of the surveillance apparatus.

The configuration of the surveillance apparatus 7 will be described below. FIG. 8 is a diagram illustrating an example of the configuration of the surveillance apparatus 7.

The surveillance apparatus 7 includes a control unit 71, a storage unit 72, an audio input unit 73, an audio processing unit 74, and a communication unit 75. These components of the surveillance apparatus 7 are connected with each other via a bus 76. The surveillance apparatus 7 may also include a human sensor or may be connected to an external human sensor.

The control unit 71 including, for example, a CPU controls the entire surveillance apparatus 7.

The storage unit 72 is used as storage areas for storing various types of data. More specifically, the storage unit 72 is mainly used as a storage area for storing programs to be executed by the control unit 71, a work area used during program execution, a storage area for storing setting information, such as the sound volume detection setting, that is used by the audio processing unit 74, and a storage area for storing audio data generated by the audio input unit 73.

The audio input unit 73 converts an analog signal acquired via the microphone of the surveillance apparatus 7 into digital data, subjects the digital data to necessary audio processing, and sequentially stores the audio data in the storage unit 72. In a case where the audio data is stored in the storage unit 72, the control unit 71 receives an audio acquisition event from the audio input unit 73.

The audio processing unit 74 performs the compression and encoding processing conforming to the G.711, G.726, or Advanced Audio Coding (ACC) format to the audio data stored in the audio input unit 73 to generate audio data and stores the audio data in the storage unit 72.

The communication unit 75 receives a control command from an external device and transmits a response for the control command to the external device. When the communication unit 75 receives a command from the external device, the control unit 71 receives a command reception event from the communication unit 75. The communication unit 75 also transmits a control command generated by the control unit 71 to the external device. Then, the communication unit 75 sequentially reads the audio data generated by the compressing and encoding processing by the audio processing unit 74 from the storage unit 72, and transmits the audio data as an audio stream to the client apparatus 2.

A display screen of the audio setting displayed by the client apparatus 2 will be described below.

Figure 9:
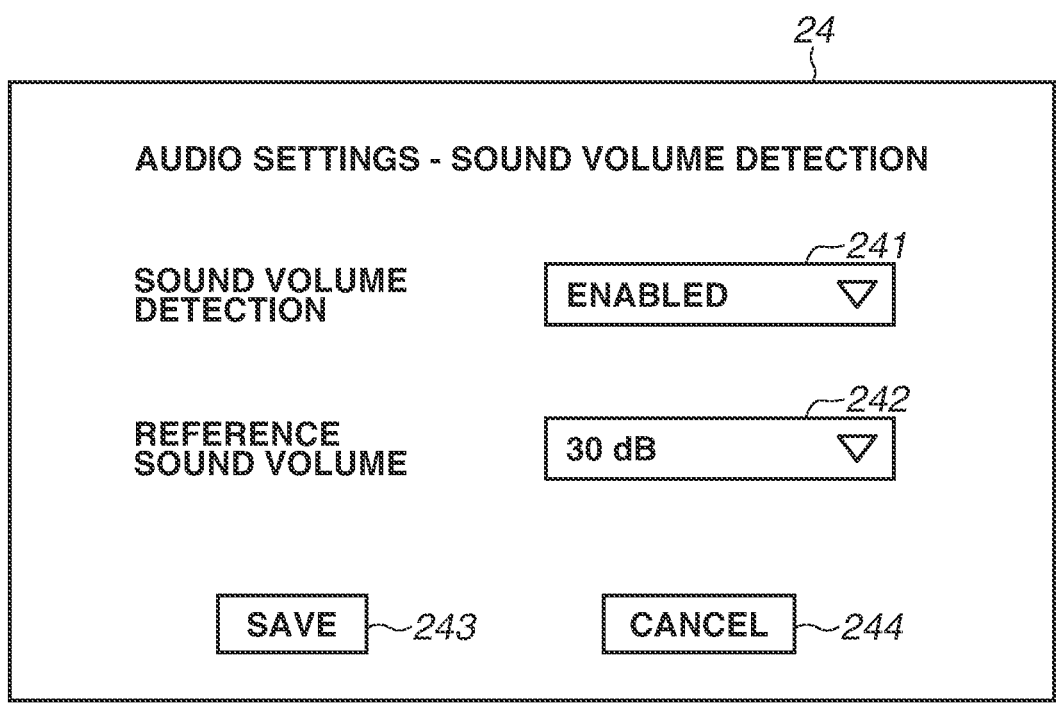
FIG. 9 is a diagram illustrating an example of a display screen of an audio setting.

FIG. 9 is a diagram illustrating an example of a display screen 24 of the sound volume detection setting of the audio settings in the surveillance apparatus 7. The sound volume detection refers to a function of detecting an input of a sound volume equal to or larger than a reference sound volume. The display screen 24 is displayed when the control unit of the client apparatus 2 executes a program stored in the storage unit of the client apparatus 2 according to an instruction for performing the sound volume detection setting by the user.

The display screen 24 displays a selection list 241 for enabling/disabling the sound volume detection setting, a selection list 242 for setting the reference sound volume, a save button 243 for saving the settings, and a cancel button 244 for canceling the settings.

When the device control apparatus 8 is in the OFF state, the user operates the client apparatus 2 to perform the sound volume detection setting in the surveillance apparatus 7. Referring to the display screen 24 illustrated in FIG. 9, the user enables the sound volume detection setting in the selection list 241, and selects a reference sound volume setting in the selection list 242. When the user presses the Save button 243, the control unit of the client apparatus 2 stores information about the sound volume detection setting in the storage unit.

The control unit of the client apparatus 2 transmits the information about the sound volume detection setting input by the user to the surveillance apparatus 7. The communication unit 75 of the surveillance apparatus 7 receives the information about the sound volume detection setting, and the control unit 71 stores the information about the sound volume detection setting in the storage unit 72. While the present exemplary embodiment is described using a case of a sound volume detection setting, an abnormal sound detection setting and other settings may also be used as long as the setting is affected by a sound volume change or an audio frequency change.

A display screen for prompting to change the settings displayed by the client apparatus 2 will be described below. The display screen illustrated in FIG. 10 is displayed when the control unit of the client apparatus 2 executes a program stored in the storage unit of the client apparatus 2 at the timing in step S24 of the flowchart illustrated in FIG. 11 (described below).

A display screen 25 includes display areas 251 and 252. The display area 251 notifies the user of the setting to be affected when the surveillance apparatus 7 transmits the ON command, the device control apparatus 8 operates, and a sound volume change is caused by the operation of the device control apparatus 8. The display area 252 notifies the user of the recommended setting for reducing or preventing a sound volume change. The display screen 25 also displays a YES button 253 which is used for determining to change the setting to the recommended setting, and a NO button 254 which is used for determining to leave the setting unchanged.

The user operates the client apparatus 2 to determine whether to change the setting to the recommended setting. More specifically, the user checks the settings of the display areas 251 and 252, and in a case where the user wants to change the setting to the recommended setting, the user presses the YES button 253. Then, the control unit of the client apparatus 2 stores the information for the recommended setting in the storage unit. Like the first exemplary embodiment, the control unit 71 of the surveillance apparatus 7 stores information about the recommended setting in the storage unit 72.

An example of processing that is performed by the surveillance apparatus 7, to reduce or prevent the influence, if a change in the surrounding environment is caused by an operation of the device control apparatus 8 will be described below with reference to the flowchart illustrated in FIG. 11.

Figure 11:
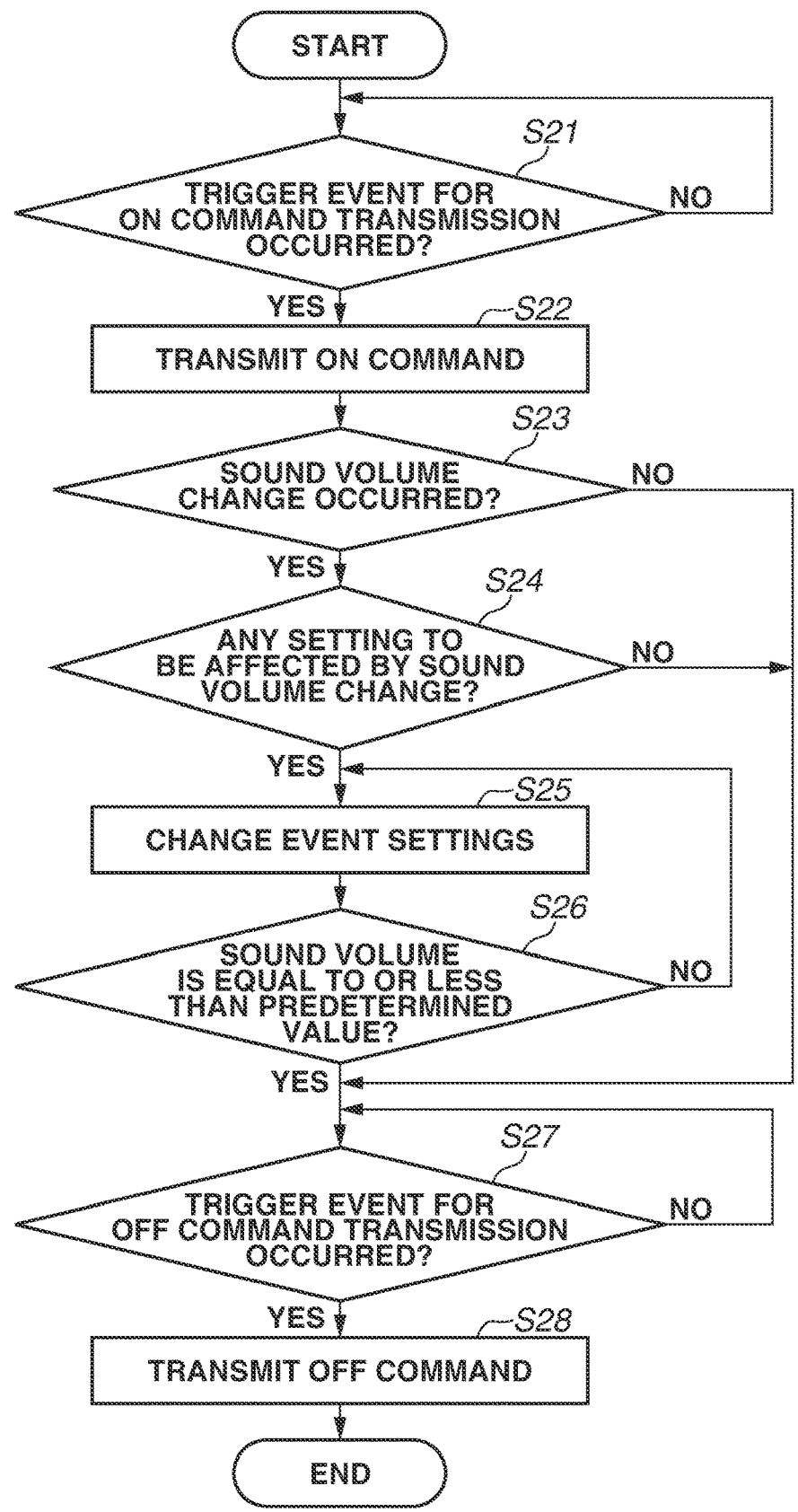
FIG. 11 is a flowchart illustrating an example of processing of the surveillance apparatus.

The flowchart illustrated in FIG. 11 is implemented by the control unit 71 of the surveillance apparatus 7 executing a program stored in the storage unit 72. The flowchart illustrated in FIG. 11 is started when the surveillance apparatus 7 is activated and then connected to the device control apparatus 8 to communicate with each other. In the present exemplary embodiment, the user has performed the sound volume detection setting and the event settings and information about the sound volume detection setting and information about the event settings have been stored in the storage unit 72 of the surveillance apparatus 7. Like the first exemplary embodiment, the control unit 71 of the surveillance apparatus 7 stores the event settings in the storage unit 72.

In step S21, the control unit 71 determines whether the trigger event for performing the action (the ON command transmission in step S22) occurs. This processing is similar to the above-described processing in step S11. In a case where the trigger event occurs (YES in step S21), the processing proceeds to step S22. Meanwhile, in a case where the trigger event does not occur (NO in step S21), the control unit 71 waits for the occurrence of the trigger event.

In step S22, the control unit 71 transmits the ON command to the device control apparatus 8 via the communication unit 75. This processing is similar to the above-described processing in step S12. Like the first exemplary embodiment, the ON command that can specify the parameter information can be used.

When receiving the ON command, the device control apparatus 8 changes from the OFF state to the ON state. According to the present exemplary embodiment, the device control apparatus 8 outputs audio at a sound volume according to the parameter information. In a case where the device control apparatus 8 has already received the ON command, the device control apparatus 8 continues audio output.

In step S23, the control unit 71 acquires sound volume information about the audio data input to the audio input unit 73 before and after the ON command transmission, and determines whether a sound volume change occurs. In the storage unit 72, the audio processing unit 74 stores the average sound volume value for the predetermined time based on the sound volume information acquired from the audio input unit 73 before and after the ON command transmission, and therefore the control unit 71 can acquire the sound volume information for the audio data.

The control unit 71 compares the average sound volume immediately before the ON command transmission with the average sound volume after the ON command transmission (e.g., after one second). In a case where the difference between the two average sound volumes is equal to or larger than a predetermined value (threshold value), the control unit 71 determines that a sound volume change has occurred. The threshold value may be prestored in the storage unit 72, or the user may set the threshold value in the surveillance apparatus 1 via the client apparatus 2.

In a case where the control unit 71 determines that a sound volume change has occurred (YES in step S23), the processing proceeds to step S24. Meanwhile, in a case where the control unit 71 determines that a sound volume change has not occurred (NO in step S23), the processing proceeds to step S27.

In step S24, the control unit 71 determines whether there is setting to be affected by a sound volume change. A setting to be affected by a sound volume change is a setting which causes an unintended result in a situation different from the sound environment intended by the user. For example, in a case of the audio settings illustrated in FIG. 9, a sound volume change may affect the sound volume detection. Therefore, the sound volume detection setting is a setting to be affected by a sound volume change.

In a case where there is a setting to be affected by a sound volume change (YES in step S24), the processing proceeds to step S25. Meanwhile, in a case where there is no setting to be affected by a sound volume change (NO in step S24), the processing proceeds to step S27.

In a case where there is a setting to be affected by a change in the surrounding environment, the control unit 71 may transmit information indicating that there is a setting to be affected by a change in the surrounding environment, to the client apparatus 2 via the communication unit 75. When receiving the information indicating that there is a setting to be affected by a change in the surrounding environment, the client apparatus 2 may display a display screen for prompting the user to change the setting to be affected, on the display unit of the client apparatus 2. More specifically, the display screen 25 includes display areas 251 and 252 as illustrated in FIG. 10. The display area 251 displays the sound volume detection setting as a setting to be affected by the ON command transmission. The display area 252 displays the action for the event settings as a recommended setting, i.e., reduction of the parameter information (level) in the ON command. The client apparatus 2 can display the display screen 25 by receiving display data for displaying a display screen from the surveillance apparatus 7 and referencing display data stored in the storage unit of the client apparatus 2.

The control unit of the client apparatus 2 transmits the information indicating whether the user has determined to change the setting to the recommended setting, to the surveillance apparatus 7. By the communication unit 75 of the surveillance apparatus 7 receiving the information indicating that the user has determined to change the setting to the recommended setting, the processing of step S25 is performed. Meanwhile, by the communication unit 75 not receiving the information, the processing of step S27 is performed.

In step S25, in a case where there is a setting to be affected by a change in the surrounding environment, the control unit 71 changes the setting to reduce or prevent an influence of the change in the surrounding environment. More specifically, the control unit 71 changes the event settings to settings by which the parameter information in the ON command transmitted in step S22 is adjusted to a lower value by a predetermined step, and transmits the ON command to the device control apparatus 8 again. More specifically, the control unit 71 changes the event settings to reduce (or also prevent) a sound volume change. The predetermined step may be prestored in the storage unit 72, or the user may set the predetermined step in the surveillance apparatus 7 via the client apparatus 2.

When receiving the ON command, the device control apparatus 8 changes the sound volume of the audio output according to the numeric values of the specified parameter information.

In step S26, the control unit 71 acquires the sound volume information about the audio data input from the audio input unit 73 and determines whether the sound volume is equal to or less than a predetermined value. The predetermined value is the reference sound volume of the selection list 242 set in the display screen 24 illustrated in FIG. 9. In a case where the control unit 71 determines that the sound volume is equal to or less than the predetermined value (YES in step S26), the processing proceeds to step S27. Meanwhile, in a case where the control unit 71 determines that the sound volume is larger than the predetermined value (NO in step S26), the processing returns to step S25.

In step S27, the control unit 71 determines whether the trigger event for performing the action (the ON command transmission in step S22) is completed. More specifically, the control unit 71 reads the information about the event settings stored in the storage unit 72 and determines whether the detection information is no longer received from the human sensor (sensor A). In a case where the trigger event is completed (YES in step S27), the processing proceeds to step S28. Meanwhile, in a case where the trigger event is not completed (NO in step S27), the control unit 71 waits for completion of the trigger event.

In step S28, when the trigger event is completed, the control unit 71 performs an action to be performed at the end of the trigger event. More specifically, the control unit 71 reads the information about the event settings stored in the storage unit 72, and transmits the OFF command as the action to be performed at the end of the trigger event, to the device control apparatus 8 via the communication unit 75.

When receiving the OFF command, the device control apparatus 8 changes from the ON state to the OFF state. According to the present exemplary embodiment, the device control apparatus 8 stops the audio output. In a case where the device control apparatus 8 has already received the OFF command, the device control apparatus 8 continues stopping the audio output.

According to the present exemplary embodiment, the surveillance apparatus 7 transmits a predetermined command to the device control apparatus 8 and the device control apparatus 8 operates. In a case where the surrounding environment is changed by the operation of the device control apparatus 8, the surveillance apparatus 7 changes the setting to reduce or prevent the change in the surrounding environment. This configuration can reduce or prevent a change in the surrounding environment by the operation of the device control apparatus 8, and therefore, the user can perform intended surveillance using the surveillance apparatus 7, and also an influence of when the surrounding environment changes can be reduced or prevented.

More specifically, in a case where the surveillance apparatus 7 detects audio and the device control apparatus 8 outputs audio during operation, the sound volume of the audio output of the device control apparatus 8 can be reduced by changing the event settings to reduce the parameter information in the ON command. Therefore, the surveillance apparatus 7 can reduce or prevent the sound volume detection not intended by the user, and an influence of when a sound volume change occurs can be reduced (or prevented).

While, in the present exemplary embodiment, the OFF command is immediately transmitted to the device control apparatus 8 when the trigger event is completed, the present disclosure is not limited thereto. The changed setting may be restored to the former setting before the change when the trigger event is completed. In this case, the control unit 71 changes the parameter information in the ON command based on the sound volume change each time the ON command is transmitted. However, in a case where the control unit 71 determines that, if a sound volume change occurs after the ON command is once transmitted, there is a setting to be affected by the sound volume change, the control unit 11 may change the event settings to the settings by which the sound volume becomes equal to or less than the reference sound volume, when transmitting the ON command for the second time and subsequent times. The control unit 71 may also detect a sound volume change when transmitting the ON command for the second time and subsequent times. In a case where a sound volume change is not detected, the control unit 71 may restore the event settings (changed to the parameter information in the ON command) to the former settings by which the sound volume becomes equal to or less than the reference sound volume.

The present exemplary embodiment has been described above centering on a case where the control unit 71 determines that a sound volume change has occurred if a sound volume change occurs even once after the ON command transmission, the present disclosure is not limited thereto. For example, the control unit 71 may determine that a sound volume change has occurred after the ON command transmission if a sound volume change successively occurs a predetermined number of times each time the control unit 71 transmits the ON command.

Although the present exemplary embodiment has been described above centering on a case where the event settings are changed to adjust the sound volume to the volume equal to or less than the reference sound volume, the present disclosure is not limited thereto. The audio settings may be changed instead of the event settings. For example, the control unit 71 may change the audio setting to reduce the reference sound volume and may temporarily change the sound volume detection setting from an enabled state to a disabled state. While detection of a sound volume change is used as an example case, for example, detection of abnormal sounds such as a scream sound, a gunshot sound, and a glass breaking sound may also be used.

While the present disclosure has specifically been described in detail based on the above-described exemplary embodiments, the present disclosure is not limited thereto but can be modified in diverse ways within the ambit of the appended claims. The above-described exemplary embodiments may be suitably combined.

For example, a part or whole of the above-described function configurations of the surveillance system may be implemented in hardware components including the surveillance apparatus 1, the client apparatus 2, the device control apparatus 3, the peripheral device 4, the surveillance apparatus 7, and the device control apparatus 8.

The number of settings to be affected by an environmental change is not limited to one, and may be two or more. The control units 11 and 71 can suitably select whether to change each setting to be affected by an environmental change or whether to change each setting to reduce or prevent an environmental change, according to the priority relation between each setting to be affected by an environmental change and a setting for reducing or preventing a change, or according to whether the setting can be performed. The user may select whether to change each setting to be affected by an environmental change or whether to change each setting to restrict an environmental change.

The configuration and processing of the above-described exemplary embodiments may be applied to computers and service instruments other than the surveillance apparatus 1, the client apparatus 2, the device control apparatus 3, the peripheral device 4, the surveillance apparatus 7, and the device control apparatus 8.

The surveillance apparatus 1 may include an audio input unit, an audio processing unit, and an image analysis processing unit in addition to the above-described components. The surveillance apparatus 7 may include an imaging unit, an imaging control unit, a compression and encoding unit, and an image analysis processing unit in addition to the above-described components.

At least a part or whole of the components of the surveillance apparatuses 1 and 7 may be implemented by hardware. When implementing the components of the surveillance apparatuses 1 and 7 by hardware, for example, a dedicated circuit may be automatically generated on a Field Programmable Gate Array (FPGA) based on a program for implementing each step by using a predetermined compiler. Like the FPGA, a Gate Array circuit may be formed to implement the components of the surveillance apparatuses 1 and 7 by hardware. The components of the surveillance apparatuses 1 and 7 may also be implemented by an Application Specific Integrated Circuit (ASIC).

The present invention is also implemented by performing the following processing. More specifically, a program for implementing the functions of the above-described exemplary embodiments is supplied to a system or apparatus via a network or various types of storage media, and a computer (a CPU or micro processing unit (MPU)) of the system or apparatus reads and executes the program. In this case, the program and a recording medium storing the program configure the present invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-107960, filed Jun. 10, 2019, which is hereby incorporated by reference herein in its entirety.

What is claimed is:

1. A surveillance apparatus comprising:
at least one processor causing the surveillance apparatus to act as:
a communication unit configured to transmit a command to an external device;
a detection unit configured to detect a change in a surrounding environment in a case where the change is caused by an operation of the external device or a peripheral device controlled by the external device operating in response to the command; and
a control unit configured to change, in a case where there is a function to be affected by the change detected by the detection unit, a setting of the function to a different setting with which the change is reduced,
wherein, in a case where there is a function to be affected by the change detected by the detection unit, the control unit changes the setting of the function to a setting with which the function is not affected or changes the setting of the function to reduce or prevent the change detected by the detection unit, wherein, in a case where there is a function to be affected by the change detected by the detection unit, the control unit changes a setting for transmitting the command to reduce or prevent the change,
wherein the command includes parameter information for specifying a level at which the external device or the peripheral device operates,
wherein, in a case where the surveillance apparatus has a function to be affected by the change detected by the detection unit, the control unit changes a setting of the parameter information in the command to reduce the change, and
wherein the communication unit transmits the command including the parameter information of which the setting has been changed by the control unit, to the external device.

2. The surveillance apparatus according to claim 1, wherein, in a case where there is a function to be affected by the change detected by the detection unit, the control unit changes the setting of the function from a manual mode to an automatic mode or from an enabled state to a disabled state, so that the function is not affected.

3. The surveillance apparatus according to claim 1, further comprising:
an imaging unit,
wherein the detection unit detects a luminance change in a viewing angle to be captured by the imaging unit.

4. The surveillance apparatus according to claim 3, wherein a function to be affected by the luminance change detected by the detection unit corresponds to a setting of at least any one of exposure, focus, image processing, infrared light filter switching, and illumination control by the imaging unit.

5. The surveillance apparatus according to claim 1, further comprising:
an audio input unit,
wherein the detection unit detects an audio change acquired by the audio input unit.

6. The surveillance apparatus according to claim 5, wherein a function to be affected by an audio change detected by the detection unit is a function related to sound volume detection.

7. The surveillance apparatus according to claim 1, wherein, in a case where the detection unit successively detects a change in the surrounding environment a predetermined number of times, the control unit changes the setting of the function to a setting with which the function is not affected.

8. The surveillance apparatus according to claim 1, wherein, in a case where there is a function to be affected by the change detected by the detection unit, the communication unit transmits information to a display control apparatus to prompt a user to change the setting of the function to a setting with which the function is not affected.

9. The surveillance apparatus according to claim 8, wherein, upon reception of information indicating that the user has determined to change the setting to a setting with which the function is not affected, from the display control apparatus, the control unit changes the setting to the setting with which the function is not affected.

10. The surveillance apparatus according to claim 1, wherein, in a case where there is a function to be affected by the change detected by the detection unit, the control unit stores information indicating that there is a function to be affected, and
wherein, in a case where the information is stored, the control unit changes the setting of the function to a different setting with which the change is reduced, when the predetermined command is transmitted by the communication unit.

11. The surveillance apparatus according to claim 10, wherein, in a case where the information is stored, the control unit deletes the information and restores the setting to a former setting set before the changing, if a change in the surrounding environment is not detected by the detection unit after the predetermined command is transmitted by the communication unit.

12. A surveillance apparatus comprising:
at least one processor causing the surveillance apparatus to act as:
a communication unit configured to transmit a command to an external device;
a detection unit configured to detect a change in a surrounding environment in a case where the change is caused by an operation of the external device or a peripheral device controlled by the external device operating in response to the command; and
a control unit configured to change, in a case where there is a function to be affected by the change detected by the detection unit, a setting of the function to a setting with which the function is not affected,
wherein the communication unit transmits a first command to the external device to change the external device or the peripheral device from an OFF state to an ON state, and
wherein the detection unit detects a change in the surrounding environment when the change is caused by the operation of the external device or the peripheral device operating in response to the first command.

13. The surveillance apparatus according to claim 12, wherein the communication unit transmits a second command to the external device to change the external device or the peripheral device from the ON state to the OFF state, and
wherein, after changing the setting, the control unit restores the setting to a former setting set before the changing when the second command is transmitted by the communication unit.

14. A method for controlling a surveillance apparatus comprising:
transmitting a command to an external device;
detecting a change in a surrounding environment in a case where the change is caused by an operation of the external device or a peripheral device controlled by the external device operating in response to the command; and
changing, in a case where there is a function to be affected by the change detected in the detecting, a setting of the function to a different setting with which the change is reduced,
wherein, in a case where there is a function to be affected by the change detected, changing the setting of the function to a setting with which the function is not affected or changes the setting of the function to reduce or prevent the change detected,
wherein, in a case where there is a function to be affected by the change detected, changing a setting for transmitting the command to reduce or prevent the change,
wherein the command includes parameter information for specifying a level at which the external device or the peripheral device operates,
wherein, in a case where the surveillance apparatus has a function to be affected by the change detected, changing a setting of the parameter information in the command to reduce the change, and wherein the command is transmitted including the parameter information of which the setting has been changed, to the external device.

15. The method according to claim 14, wherein, in a case where there is a function to be affected by the change detected in the detecting, a setting of the function is changed to a setting with which the function is not affected or the setting is changed to reduce or prevent the change detected in the detecting.

16. The method according to claim 15, wherein, in a case where there is a function to be affected by the change detected in the detecting, the setting of the function is changed from a manual mode to an automatic mode or from an enabled state to a disabled state, so that the function is not affected.

17. A non-transitory computer-readable medium storing a program for causing a computer to execute a method for controlling a surveillance apparatus comprising:

transmitting a command to an external device;

detecting a change in a surrounding environment in a case where the change is caused by an operation of the external device or a peripheral device controlled by the external device operating in response to the command; and changing, in a case where there is a function to be affected by the change detected in the detecting, a setting of the function to a different setting with which the change is reduced, wherein, in a case where there is a function to be affected by the change detected, changing the setting of the function to a setting with which the function is not affected or changes the setting of the function to reduce or prevent the change detected, wherein, in a case where there is a function to be affected by the change detected, changing a setting for transmitting the command to reduce or prevent the change, wherein the command includes parameter information for specifying a level at which the external device or the peripheral device operates, wherein, in a case where the surveillance apparatus has a function to be affected by the change detected, changing a setting of the parameter information in the command to reduce or prevent the change, and wherein the command is transmitted including the parameter information of which the setting has been changed, to the external device.

18. A method for controlling a surveillance apparatus comprising:

transmitting a command to an external device;

detecting a change in a surrounding environment in a case where the change is caused by an operation of the external device or a peripheral device controlled by the external device operating in response to the command; and changing, in a case where there is a function to be affected by the change detected, a setting of the function to a setting with which the function is not affected, wherein a first command is transmitted to the external device to change the external device or the peripheral device from an OFF state to an ON state, and wherein a change is detected in the surrounding environment when the change is caused by the operation of the external device or the peripheral device operating in response to the first command.

19. A non-transitory computer-readable medium storing a program for causing a computer to execute a method for controlling a surveillance apparatus comprising:

transmitting a command to an external device;

detecting a change in a surrounding environment in a case where the change is caused by an operation of the external device or a peripheral device controlled by the external device operating in response to the command; and changing, in a case where there is a function to be affected by the change detected, a setting of the function to a setting with which the function is not affected, wherein a first command is transmitted to the external device to change the external device or the peripheral device from an OFF state to an ON state, and wherein a change is detected in the surrounding environment when the change is caused by the operation of the external device or the peripheral device operating in response to the first command.

* * * * *